United States Patent
Chang

[11] Patent Number: 5,844,655
[45] Date of Patent: Dec. 1, 1998

[54] GLASSES WITH AUTOMATICALLY EXTENDED TEMPLES

[76] Inventor: Antony Chang, No. 2-1, Alley 12, Lane 266, Shi Dong Rd., Shi-Lin, Taiwan

[21] Appl. No.: 892,236

[22] Filed: Jul. 14, 1997

[51] Int. Cl.⁶ .................................................. G02C 5/22
[52] U.S. Cl. ........................... 351/153; 351/113; 351/121
[58] Field of Search .................................. 351/111, 113, 351/119, 121, 153, 116, 110, 114, 140; 16/228

[56] References Cited

U.S. PATENT DOCUMENTS

| 3,744,887 | 7/1973 | Dunbar | 351/321 |
| 5,469,232 | 11/1995 | Ichimura | 351/113 |

FOREIGN PATENT DOCUMENTS

| 914793 | 7/1946 | France | 351/153 |

*Primary Examiner*—Huy Mai
*Attorney, Agent, or Firm*—Rosenberg, Klein & Bilker

[57] ABSTRACT

Glasses with automatically extended temples comprises a pair of fronts which are interconnected by a bridge and a pair of temples which are connected to each of the fronts. The temple includes an elbow which is fixedly connected to each of the fronts. The elbow includes an upper hoop and a lower hoop serving as pivotal mounting rings for connecting a rear temple portion thereof. The temple further includes a rear temple portion which is provided with an U-shape connecting portion having an upper mounting leg and a lower mounting leg. Wherein each of the legs the connecting portion can be pivotally and suitably connected into those two upper and lower hoops respectively by inserting the upper and lower mounting legs into the upper and lower hoops. Once the glasses are withdrawn from the receiving box, the two rear temple portions will automatically extend for easy and convenient usage of the glasses.

4 Claims, 4 Drawing Sheets

GLASSES WITH AUTOMATICALLY EXTENDED TEMPLES

FIELD OF THE INVENTION

The present invention relates to glasses, more particularly, to glasses with automatically extended temples wherein the user can handle the glasses with a single hand.

DESCRIPTION OF PRIOR ART

Conventional glasses generally comprise a pair of frontal frames or fronts which are interconnected by a bridge and a pair of temples extended horizontally from and rearwardly of the fronts. Each of the temples is provided with an ear piece which can be hooked onto the ear. The frontal frames or fronts are further provided with a pair of nose pads and the glasses can be readily supported on the nose and ears by the nose pads and temples. The temples are pivotally connected to the fronts and can be folded horizontally on those two fronts when not in use or stored in the box. When the glasses are to be worn, the two temples shall be firstly fully extended, and this movement can only be done by both hands. It is impossible and difficult to open and extend those two temples with a single hand. This results in inconvenience to the user in some situations, for example, while driving a car or carrying an article with one hand. In light of this, providing glasses in which the temples can be extended with only one hand is desirable from the viewpoint of convenient use.

SUMMARY OF THE INVENTION

It is the objective of this invention to provide glasses having a pair of temples which are automatically extended temples.

In order to achieve the object set forth, the glasses with automatically extended temples comprises a pair of frontal frames or fronts which are interconnected by a bridge and a pair of temples which are connected to each of the fronts. The temple includes an elbow which is fixedly connected to each of the fronts. The elbow includes an upper hoop and a lower hoop serving as pivotal mounting rings for connecting with a rear temple portion of the temple. The temple further includes a rear temple portion which is provided with a U-shape connecting portion having an upper mounting leg and a lower mounting leg. Each of the legs of the connecting portion can be pivotally and suitably connected into the two upper and lower hoops respectively by inserting the upper and lower mounting legs into the upper and lower hoops. Once the glasses are withdrawn from the receiving box, the two rear temple portions will automatically extend for easy and convenient usage.

BRIEF DESCRIPTION OF THE DRAWINGS

In order that the present invention may more readily be understood the following description is given, merely by way of example with reference to the accompanying Drawings, in which.

DETAILED DESCRIPTION OF THE PREFERRED EMBODIMENT

Figure 1:
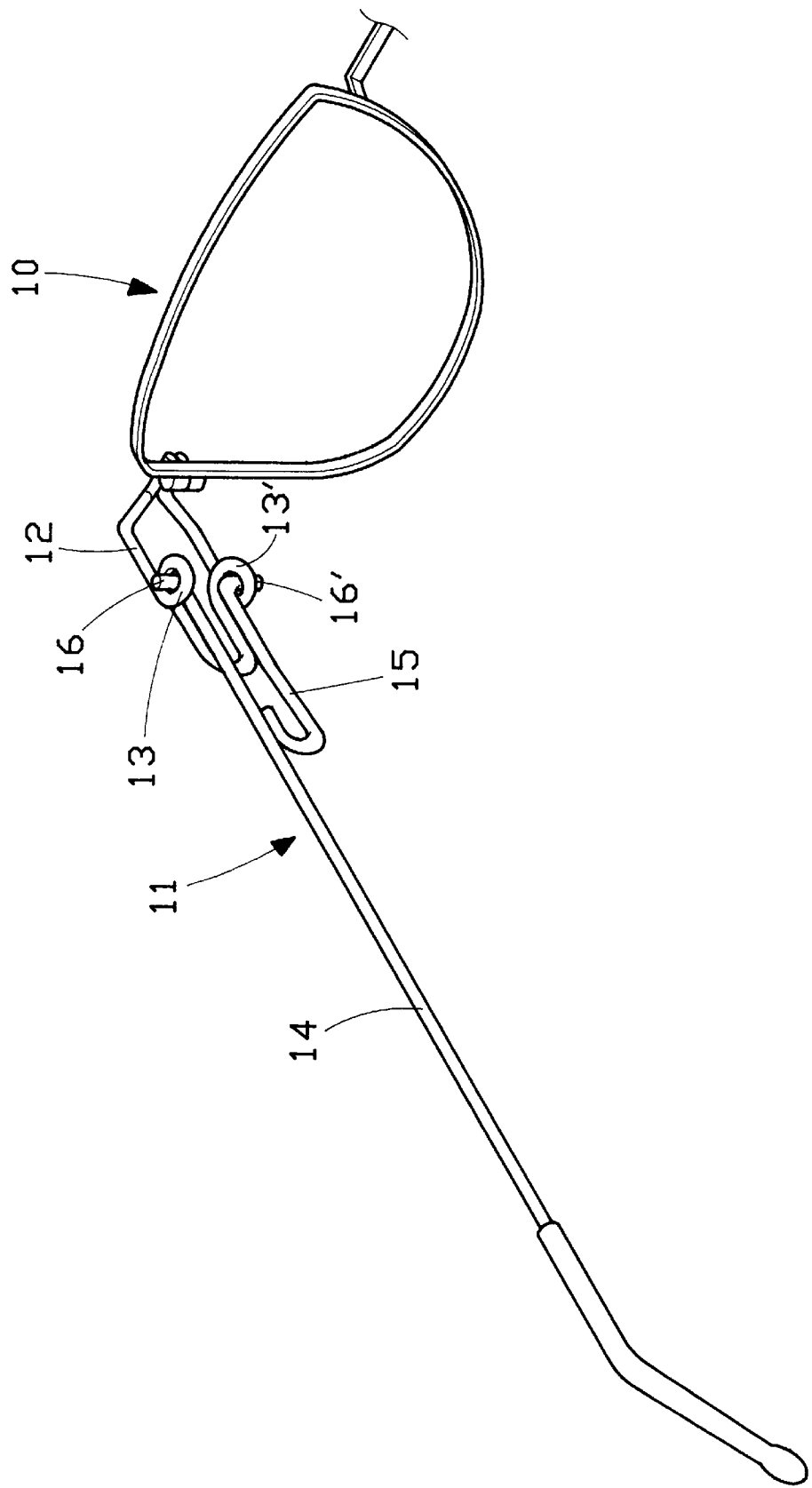
FIG. 1 is a perspective view of the glasses made according to the present invention.
Figure 2:
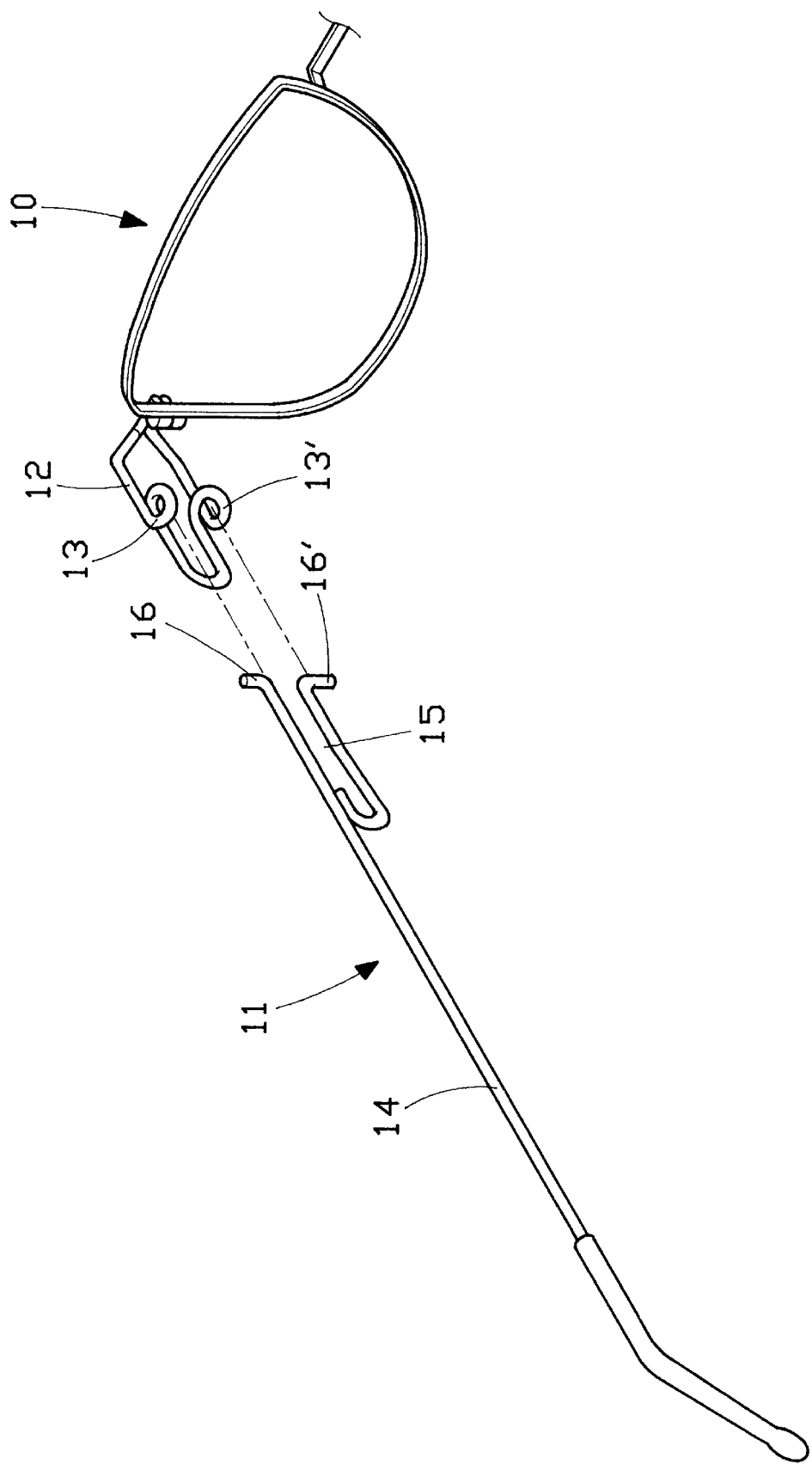
FIG. 2 is an exploded perspective view of the glasses made according to the present invention.
Figure 3:
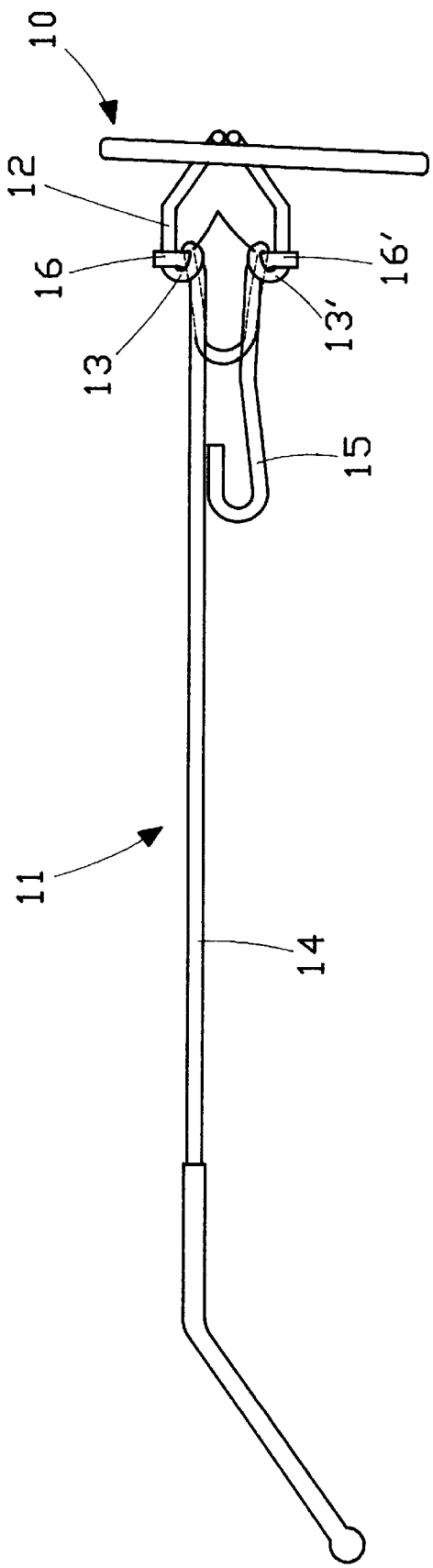
FIG. 3 is a side elevational view of the glasses made according to the present invention when in use.

Referring to FIGS. 1, 2 and 3, the glasses made according to the present invention generally comprises a pair of frontal frames or fronts 10 which are interconnected by a bridge and a pair of temples 11 which are pivotally connected to each of the frontal frames 10. An improvement is provided at the connection between the front 10 and the temple 11. Since the connection between the front 10 and temple 11 at left and right are identical to each other, only one side is described in detail.

According to the preferable embodiment, the temple 11 is provided with an elbow 12 which is fixedly connected to the front 10 and is made from resilient wires. The elbow 12 includes an upper hoop 13 and a lower hoop 13' serving as pivotal mounting rings for connecting a temple 11 thereof. The upper hoop 13 and the lower hoop 13' are offset from each other and are disposed in a common plane. The distance A between the outer ends of the hoops 13, 13' is longer than the distance B between the inner ends of the hoops 13, 13', as clearly shown in FIG. 4. In light of this, the upper hoop 13 and the lower hoop 13' are relatively inclined to each other. The temple 11 further includes a rear temple portion 14 which is also made from resilient wire. One end of the rear temple portion 14 is provided with a U-shape connecting portion 15 which includes an upper mounting leg 16 and a lower mounting leg 16'. These two mounting legs 16, 16' of the connecting portion 15 can be pivotally and suitably connected into those two upper and lower hoops 13, 13' respectively by inserting the legs 16, 16' into the hoops 13, 13'. By this arrangement, the rear temple portion 14 is pivotally connected to the elbow 12 by the pivotally engagement between the mounting legs 16, 16' and the hoops 13, 13' and a complete temple 11 is formed.

One advantageous feature of this invention is that the "hinge" formed by the mounting legs 16, 16' and the hoops 13, 13' is free from any small bolt. Consequently, assembly can be performed in a more efficient and expedient manner. Furthermore, the small bolt will not be lost due to loosening thereof.

Figure 4:
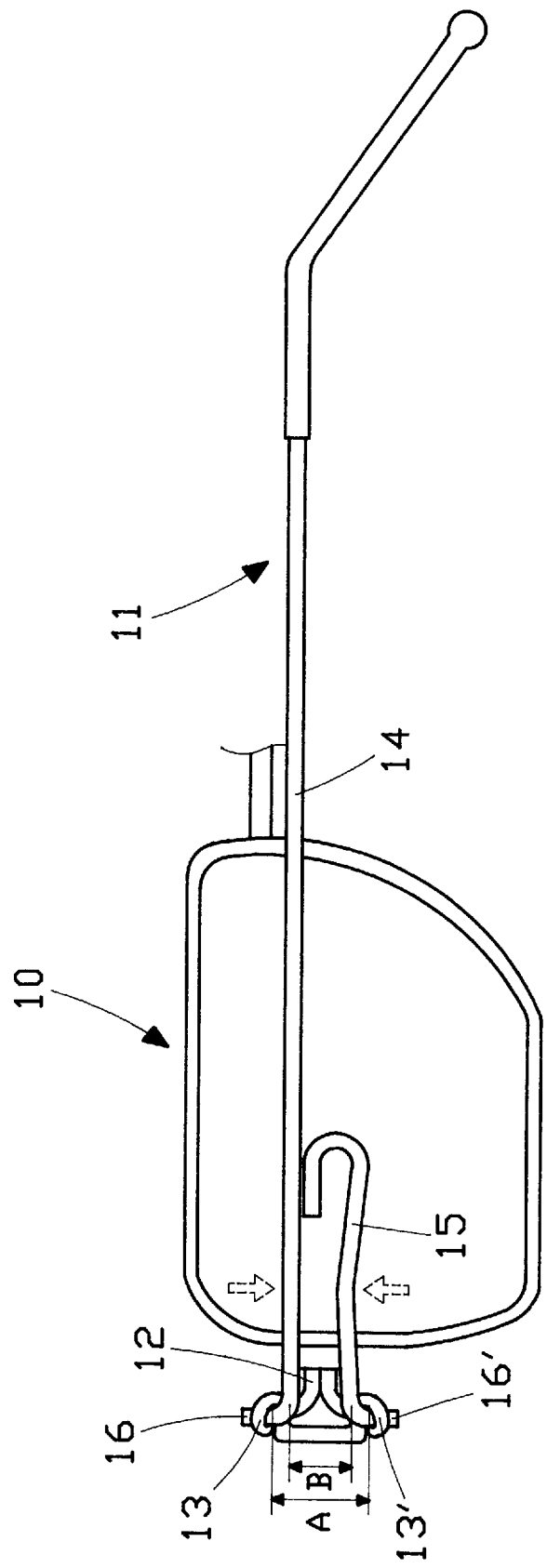
FIG. 4 is a rear view of the glasses made according to the present invention when not in use.

As described above, the upper and lower hoops 13, 13' are offset from each other, and as a result, when the rear temple portion 14 is folded horizontally, a biasing force will be formed on the upper and lower hoops 13, 13' and the upper and lower mounting legs 16, 16', as shown in FIG. 4. Consequently, when the external force applied to the rear temple 14 is released, the rear temple portion 14 will be automatically extended by the biasing force. Once the temples 11 are fully extended, the user may readily apply the glasses to his or her head using a single hand.

When the glasses are not in use, the user may firstly fold one temple 11 onto the fronts 10 and insert the glasses into the receiving box from an opening located at one end thereof. While the glasses are being placed into the receiving box, the other temple 11 is also folded onto the fronts 10. By this arrangement, the glasses are completely and suitable received within the receiving box. In use, once the glasses are fully withdrawn from the receiving box, both temples 11 will be automatically extended by the biasing force produced by the resilient wire while it is stored during the storage of the glasses. The user may readily and conveniently put on the glasses while he/she is driving or carrying an article.

From the foregoing description, it can be readily appreciated that the problems and inconvenience encountered by the conventional glasses can be completely solved by the provision of the present invention since the temples thereof can be automatically extended.

While one particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. Glasses with automatically extended temples, comprising:

a pair of frontal frames which are interconnected by a bridge and a pair of temples connected respectively to each of said frontal frames, each temple in said pair of temples including an elbow fixedly connected to said front, said elbow including upper and lower hoops serving as pivotal mounting rings for connection with a rear temple portion of said temple, said rear temple portion including a U-shaped connecting portion having upper and lower mounting legs provided for respective pivotal insertion into said upper and lower hoops of said elbow.

2. The glasses as recited in claim 1 wherein said upper and lower hoops are offset from each other.

3. The glasses as recited in claim 1 wherein said elbow and rear temple portion are made from resilient wire.

4. The glasses as recited in claim 1 wherein a distance between outer ends of said upper and lower hoops is greater than a distance between inner ends of said upper and lower hoops.

* * * * *